ized Paper (TM)

(12) United States Patent
Chapdelaine-Couture et al.

(10) Patent No.: US 11,100,659 B2
(45) Date of Patent: Aug. 24, 2021

(54) OBJECT DETECTION USING MULTIPLE THREE DIMENSIONAL SCANS

(71) Applicant: Apple Inc., Cupertino, CA (US)

(72) Inventors: Vincent Chapdelaine-Couture, Sunnyvale, CA (US); Mohamed Selim Ben Himane, Milpitas, CA (US)

(73) Assignee: Apple Inc., Cupertino, CA (US)

( * ) Notice: Subject to any disclaimer, the term of this patent is extended or adjusted under 35 U.S.C. 154(b) by 129 days.

(21) Appl. No.: 16/458,425

(22) Filed: Jul. 1, 2019

(65) Prior Publication Data

US 2020/0020118 A1 Jan. 16, 2020

Related U.S. Application Data

(60) Provisional application No. 62/697,512, filed on Jul. 13, 2018.

(51) Int. Cl.
*G06T 7/37* (2017.01)
*G06T 17/10* (2006.01)
*G06K 9/46* (2006.01)
*G06T 7/73* (2017.01)

(52) U.S. Cl.
CPC ............. *G06T 7/37* (2017.01); *G06K 9/4609* (2013.01); *G06T 7/73* (2017.01); *G06T 17/10* (2013.01); *G06T 2207/10028* (2013.01)

(58) Field of Classification Search
CPC .................................... G06T 7/37; G06T 7/73
See application file for complete search history.

(56) References Cited

U.S. PATENT DOCUMENTS

| 6,974,964 B1* | 12/2005 | Wang ................. G01B 11/2522 250/559.29 |
| 2005/0089205 A1* | 4/2005 | Kapur ................... A61B 8/5238 382/128 |

FOREIGN PATENT DOCUMENTS

| CN | 101825444 A | 9/2010 |
| CN | 102003938 A | 4/2011 |
| CN | 102042825 A | 5/2011 |
| CN | 108133654 A | 6/2018 |

OTHER PUBLICATIONS

The State Intellectual Property Office of the People's Republic of China, Patent Search Report (with English translation) Chinese Patent Application No. 201910623350.6, 5 pages (Mar. 24, 2021).

* cited by examiner

*Primary Examiner* — Tuan H Nguyen
(74) *Attorney, Agent, or Firm* — Thompson Hine LLP

(57) ABSTRACT

One exemplary implementation facilitates object detection using multiple scans of an object in different conditions. For example, a first scan of the object can be created by capturing images of the object by moving an image sensor on a first path in a first condition, e.g., bright lighting. A second scan of the object can then be created by capturing additional images of the object by moving the image sensor on a second path in a second condition, e.g., dim lighting. Implementations determine a transform that associates the scan data from these multiple scans to one another and use the transforms to generate a 3D model of the object in a single coordinate system. Augmented content can be positioned relative to that object in the single coordinate system and thus will be displayed in the appropriate location regardless of the condition in which the physical object is later detected.

19 Claims, 6 Drawing Sheets

OBJECT DETECTION USING MULTIPLE THREE DIMENSIONAL SCANS

CROSS-REFERENCE TO RELATED APPLICATION

This application claims the benefit of U.S. Provisional Application Ser. No. 62/697,512 filed Jul. 13, 2018, which is incorporated herein in its entirety.

TECHNICAL FIELD

The present disclosure generally relates to detecting and tracking real world physical objects depicted in images, and in particular, to systems, methods, and devices for detecting and tracking such physical objects based on prior scans of the objects.

BACKGROUND

Various electronic devices include image sensors that capture images of the real world environment. For example, many mobile devices include image sensors that can be used to capture a sequence of frames (e.g., video frames) that are presented on the displays of such devices or stored for later viewing. Detecting and tracking the objects that appear in such frames is desirable for a variety of applications. Such detection and tracking can be facilitated by capturing images of an object and then using those images to detect the object in subsequent images. However, objects may not be detected and tracked when the capture conditions do not match the detection conditions. For example, if the lighting when the capture is performed is different than the lighting when the detection is performed, the object may not be detected.

SUMMARY

Various implementations disclosed herein include devices, systems, and methods that use multiple scans of an object in different conditions. For example, a first scan of the object can be created by capturing images of the object by moving an image sensor on a first path in a first condition, e.g., bright lighting. A second scan of the object can then be created by capturing additional images of the object by moving the image sensor on a second path in a second condition, e.g., dim lighting. The starting positions, movement, and ending positions of the image sensor will likely differ from one another for the first and second paths. Accordingly, the coordinate systems of the two scans will likely be different from one another. This is undesirable for various applications, such as augmentation. For example, if a user wants to augment the object with augmented content (e.g., defining a text info box to be displayed above the object), it is unclear which coordinate system should be used to place the augmentation. The user would likely need to perform the burdensome task of defining the augmentation with respect to the each of multiple different coordinate systems associated with each of the scans. Implementations determine a transform that associates the scan data from multiple scans of an object to one another, and thus in a common coordinate system.

Some implementations of the disclosure involve, on a computing device having a processor, a memory, and an image sensor, performing various operations to facilitate object detection using multiple 3D scans. The device obtains first scan data of a physical object (e.g., a toy building block structure) in a first condition (e.g., dim lighting) using the image sensor. The first scan data can include images (e.g., keyframes) captured from a plurality of image sensor positions in a first coordinate system. The device also obtains second scan data of the physical object in a second condition (e.g., bright lighting) using the image sensor. The second condition is generally different from the first condition in one or more ways (e.g., lighting, object state, etc.). The second scan data can include images captured from a plurality of image sensor positions in a second coordinate system.

The device determines a transform between the first coordinate system and the second coordinate system to facilitate object detection. In one implementation, the transform is determined by matching one or more images (e.g., keyframes) of the first scan data with one or more images of the second scan data. In one implementation, the transform is determined by determining an offset between poses (e.g., position and orientation) of the image sensor associated a first image of the first scan data and a second image of the second scan data. In one implementation, the transform is determined by aligning a first point cloud associated with the first scan data with a second point cloud associated with the second scan data.

After determining the transform, the device generates a three dimensional (3D) model of the physical object (e.g., a point cloud of points associated with descriptors) that incorporates the first scan data and the second scan data based on the transform. In implementations in which the 3D model is a point cloud, the points can have descriptors based on both the first scan data and the second scan data. In one implementation, the 3D model merges a first point having a descriptor based on the first scan data with a second point having a descriptor based on the second scan data, for example, based on proximity of the first point to the second point.

The 3D model that is generated can represent both the first scan data and the second scan data in a single coordinate system. This facilitates various features including but not limited to improved use of augmented content, for example, in a computer-generated reality (CGR) environment. In one implementation, augmented content is associated with the 3D model at a position relative to that single coordinate system. Thus, when the end user uses the 3D model to detect the object, the end user's device can obtain image data via its image sensor, detect the physical object using the 3D model and the image data, and align the 3D model with the physical object using the single coordinate system. This process can involve matching the image data with point cloud descriptors of the 3D model or determining a current pose of the image sensor relative to the 3D model. The end user's device can display a CGR environment depicting the physical object based on the image data and the augmented content. For example, the augmented content can be positioned based on aligning the 3D model with the physical object using the single coordinate system.

Implementations disclosed herein also provide user interface features that facilitate the capture of multiple scans to create a 3D model that represents multiple, different conditions. In one implementation, this involves enabling a user to create a 3D scan of an object in one condition and presenting a notification requesting the user create another scan or providing an option for the user to create another scan, enabling the user to create an additional scan in another condition, and automatically determining a transform between the coordinate systems for the first and second scans and generating the 3D model using both scans and the transform.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, an image sensor, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
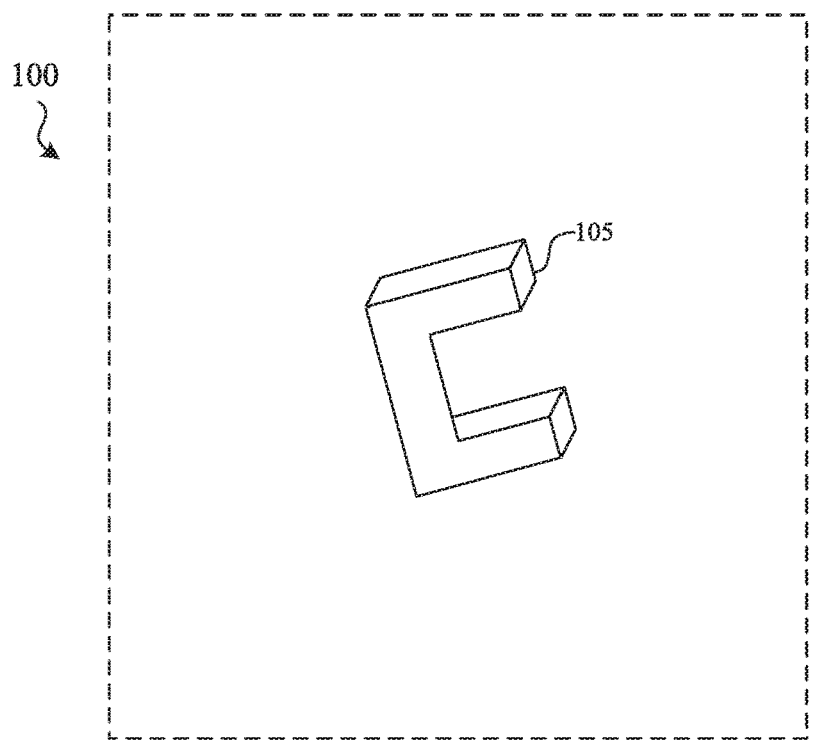
FIG. 1 is a block diagram depicting an example physical object in a real world environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

FIG. 1 is a block diagram depicting an example physical object 105 in a real world environment 100. While this example and other examples discussed herein illustrate a 3D model of a single object 105, the techniques disclosed herein are applicable to multiple objects as well as to entire scenes and other real world environments. The phrase "physical object" as used herein refers to any type of item or combination of items in the real world including, but not limited to, building blocks, a toy, a statue, furniture, a door, a building, a picture, a painting, a sculpture, a light fixture, a sign, a table, a floor, a wall, a desk, a body of water, a human face, a human hand, human hair, another human body part, an entire human body, an animal or other living organism, clothing, a sheet of paper, a magazine, a book, a vehicle, a machine or other man-made object, and any other natural or man-made item or group of items present in the real world that can be identified and modeled.

Figure 2:
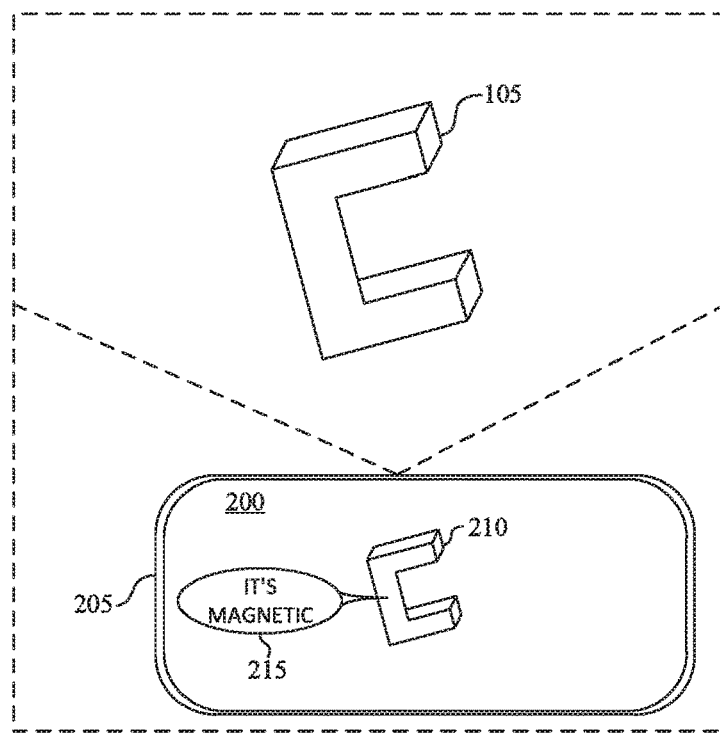
FIG. 2 is a block diagram of a mobile device displaying a computer-generated reality (CGR) environment of the example physical object of FIG. 1 in accordance with some implementations.

FIG. 2 is a block diagram of a mobile device 205 displaying a computer generated reality (CGR) environment 200 of the example physical object 105 of FIG. 1. In this example, the device 205 captures one or more images of the physical object 105 and compares those images with a 3D model (e.g., previously captured keyframes, point cloud values, etc.) to detect and track the presence of the real world object 105. The device 205 can determine the pose (e.g., position and orientation) of the physical object 105, for example, using RGB-D information, infrared-camera-based depth detection, and other such techniques. Thus, after detecting the real world object and determining its pose, the device 205 can align its 3D model of the object with the physical object in a coordinate system corresponding to real world space.

Given this alignment, the device is able to provide a CGR environment 200 that combines aspects of the real world environment with augmented content. In this example, the CGR environment 200 includes a depiction 210 of the physical object 105 and augmented content 215, which includes a text bubble and text phrase "IT'S MAGNETIC." The augmented content 215 is positioned relative to the depiction 210 of the physical object 105 based on the alignment of the physical object 105 with the 3D model. For example, the CGR environment 200 creator may have specified that the augmented content 215 is to be displayed at a location that is determined based on a fixed point at the center of the surface of the 3D model of the physical object 105. Once the 3D model is aligned with the physical object 105, the device 205 determines an appropriate location for the augmented content 215 and produces the CGR environment 200 for display.

Implementations disclosed herein enable display of augmented content as illustrated in FIG. 2 and other features even in circumstances in which the 3D model includes scan data from different scans of the physical object 105 that are associated with different coordinate systems. For example, a first scan of the physical object 105 may have been taken in a dim lighting condition and a second scan of the physical object 105 may have been taken in a bright lighting condition, and be associated with different coordinate systems.

Figure 3:
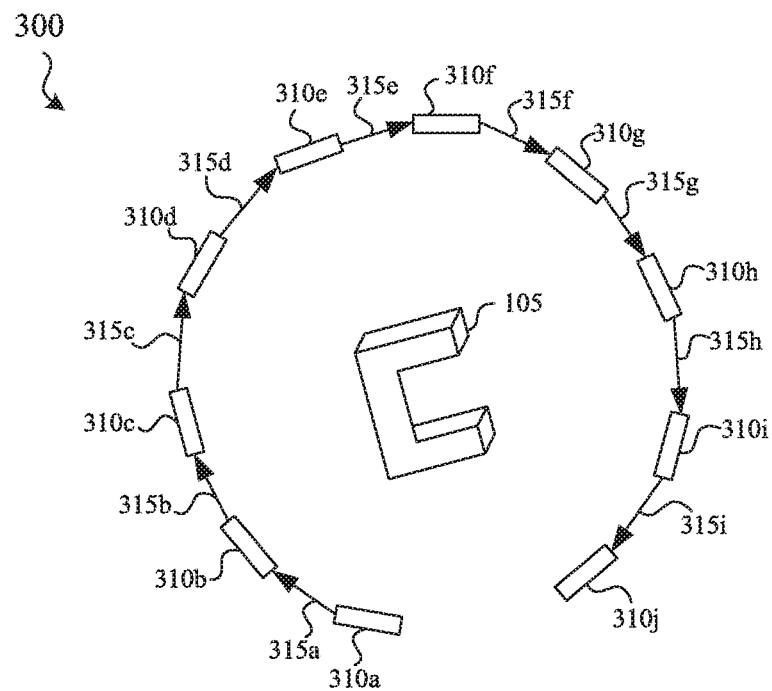
FIG. 3 is a block diagram depicting a first scan of the example physical object of FIG. 1, in accordance with some implementations.
Figure 4:
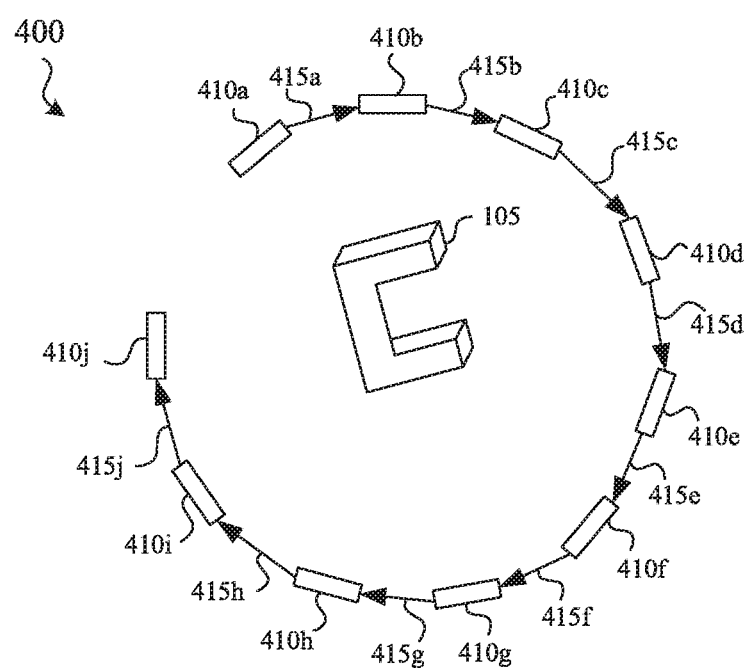
FIG. 4 is a block diagram depicting a second scan of the example physical object of FIG. 1, in accordance with some implementations.

The lack of alignment of coordinate systems is illustrated in FIGS. 3 and 4. FIG. 3 is a block diagram depicting a first scan 300 of the example physical object 105 of FIG. 1 and FIG. 4 is a block diagram depicting a second scan 400 of the example physical object 105 of FIG. 1. In FIG. 3, the first scan 300 includes a scan taken while a device (e.g., device 205 of FIG. 2) is moved along a first path 315a-i while capturing images of the physical object 105. The first path 300 includes the device at a plurality of image sensor poses 310a, 310b, 310c, 310d, 310e, 310f, 310g, 310i, 310j, from initial pose 310a at which image recording begins to final pose 310j at which recording concludes. During the first scan 300, the device can track its own pose (e.g., tracking position and orientation changes via one or more movement sensors on the device, inertial data, etc.). Thus, the relative positions of the data in a first 3D coordinate system for images captured at each of the poses 310a, 310b, 310c, 310d, 310e, 310f, 310g, 310i, 310j is known. The image data from these images can be combined to generate a first 3D model of the physical object, e.g., the first point cloud depicted in FIG. 6) based on these known poses.

In FIG. 4, the second scan 400 includes a scan taken while the device is moved along a second path 415a-i while capturing images of the physical object 105. The second path 400 includes the device at a plurality of image sensor poses 410a, 410b, 410c, 410d, 410e, 410f, 410g, 410i, 410j, from initial pose 410a at which image recording begins to final pose 410j at which recording concludes. During the second scan 400, the device can track its own pose and, thus, the relative positions of the data in a second 3D coordinate system for images captured at each of the poses 410a, 410b, 410c, 410d, 410e, 410f, 410g, 410i, 410j is known. The image data from these images can be combined to generate a second 3D model of the physical object, e.g., the second point cloud depicted in FIG. 7) based on these known poses. It should be noted that the poses determined for each of the scans may be defined relative to a coordinate system (e.g., having an origin and orientation) selected for that particular scan and the coordinate systems for each scan may be different. Thus, even if the real world location at which scans 300 and 400 were obtained are the same, the determined poses 310a-j and 410a-j may be different since they are defined relative to different coordinate systems.

Figure 5:
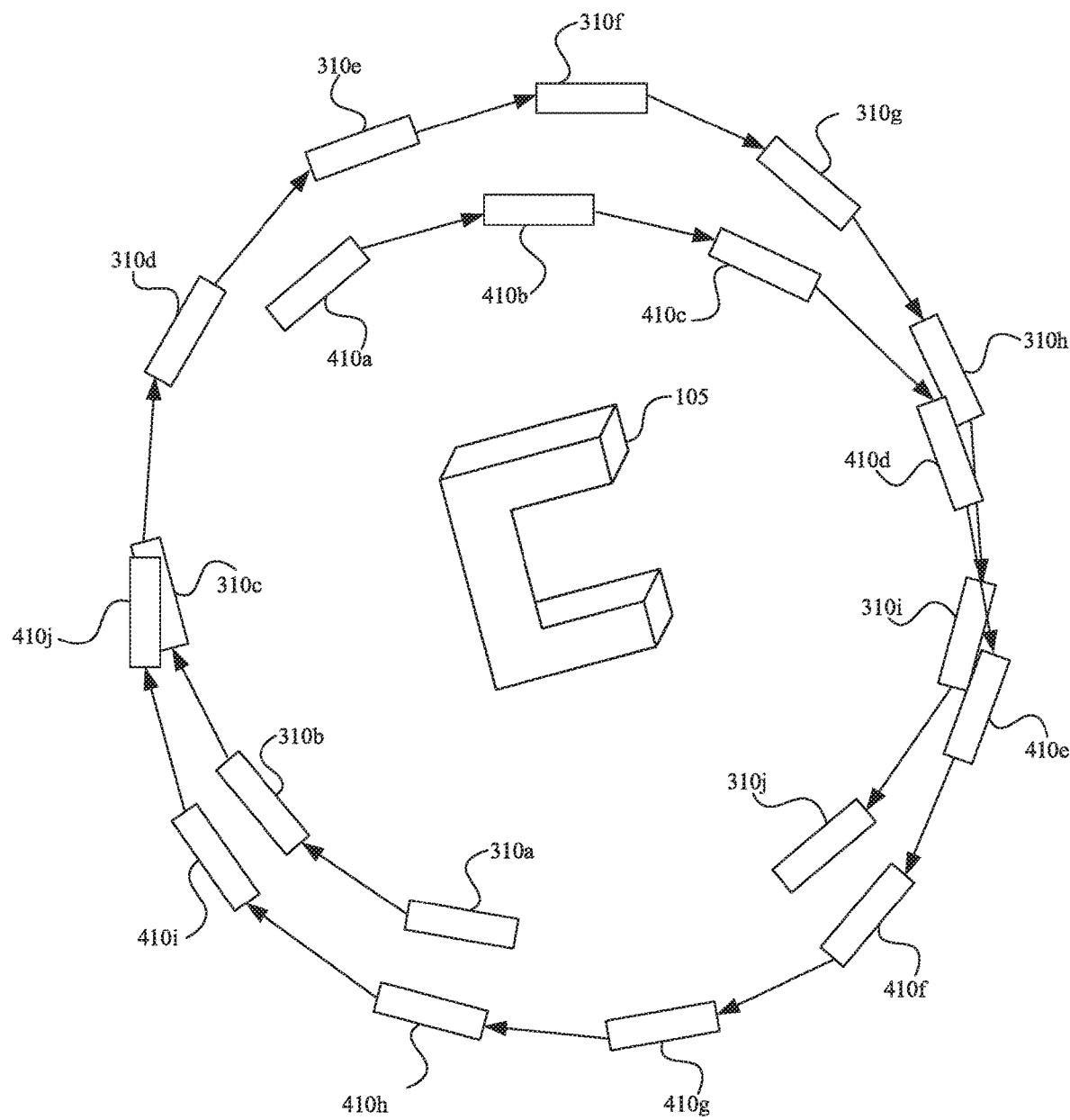
FIG. 5 is a block diagram illustrating the differences of the paths of the image sensor during the first scan of FIG. 3 and the second scan of FIG. 4, in accordance with some implementations.

FIG. 5 is a block diagram illustrating the differences of the paths of the image sensor during the first scan of FIG. 3 and the second scan of FIG. 4. Between the first scan and second scan, the device generally may not be able to accurately track its own pose change. In some circumstances, the first scan and second scan are separated by minutes, days, weeks, or even longer. In any case, the device may have no way of relating the image sensor pose positions of the first scan 300 to those of the second scan 400. Thus, techniques disclosed herein address this deficiency by determining a transform to relate the first scan to the second scan and providing practical and efficient ways to associate the 3D models developed from these scans with one another in a single, common coordinate system.

Figure 6:
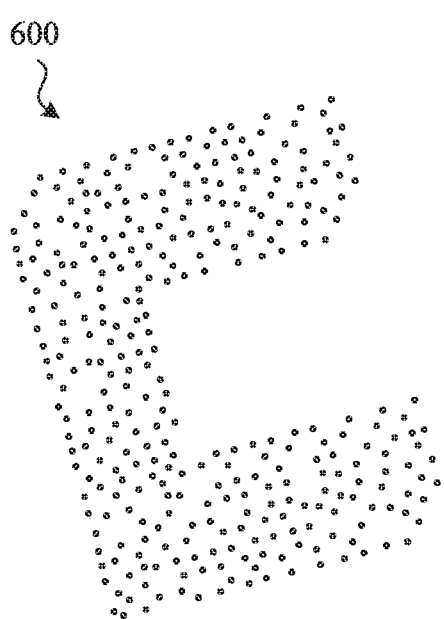
FIG. 6 is a block diagram depicting an exemplary point cloud generated based on the first scan of FIG. 3, in accordance with some implementations.
Figure 7:
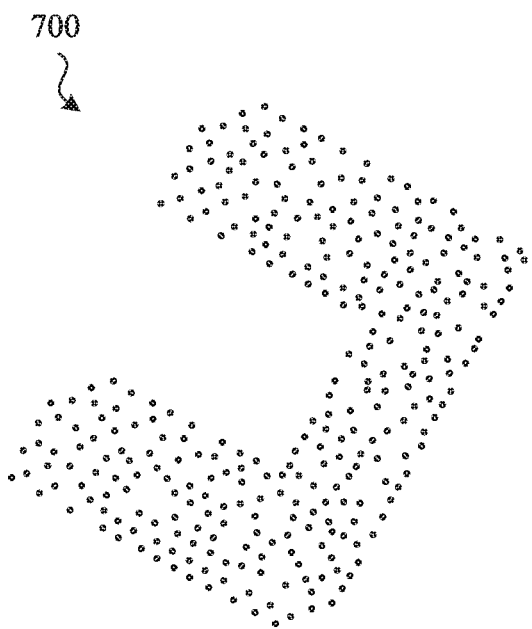
FIG. 7 is a block diagram depicting an exemplary point cloud generated based on the second scan of FIG. 4 in accordance with some implementations.

FIGS. 6 and 7 illustrate the 3D models generated from the two scans. FIG. 6 is a block diagram depicting an exemplary point cloud 600 generated based on the first scan of FIG. 3 and FIG. 7 is a block diagram depicting an exemplary point cloud 700 generated based on the second scan of FIG. 4 in accordance with some implementations.

Figure 8:
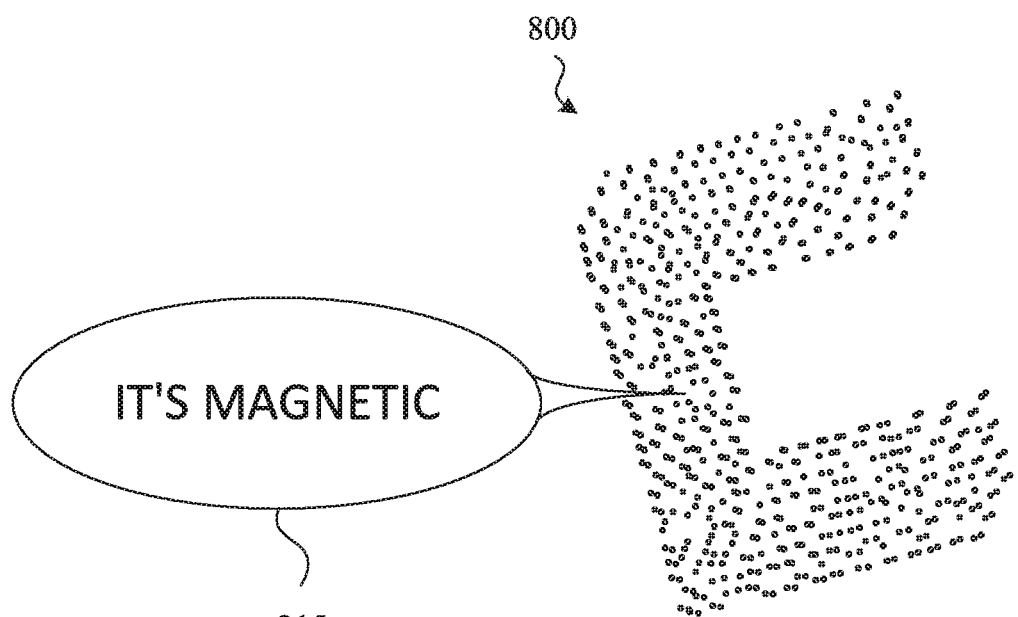
FIG. 8 is a block diagram depicting an exemplary point cloud generated based on the first scan of FIG. 3 and the second scan of FIG. 4 based on a transform determined in accordance with some implementations.

FIG. 8 is a block diagram depicting an exemplary point cloud generated based on the first scan of FIG. 3 and the second scan of FIG. 4 based on a transform determined in accordance with some implementations. In this example, a transform is determined that aligns at least one of the images (e.g., keyframes) from each of the scans. The transform can specify a positional relationship (e.g., a rotation r and a translation t) between the image sensor camera poses associated with the keyframes. This allows all of the keyframes in both scans and the associated 3D models (e.g., point clouds) to be aligned with one another using a single coordinate system. In the example of FIG. 8, the point clouds 600, 700 are aligned with one another using the coordinate system of the first scan. In other implementations, the second scan's coordinate system or another common coordinate system is used.

The point cloud 800 of FIG. 8 can include points with descriptors from multiple scans and thus with multiple, different conditions. For example, the first scan may include color values for points determined based on a scan of the physical object taken with window blinds open to allow bright lighting conditions while the second scan may include color for points determined based on a scan of the physical object taken with the window blinds closed or after the sun has gone down to provide relatively dimmer lighting conditions. Similarly, the point cloud 800 can include points with descriptors from multiple scans that reflect different configurations or states of the physical object. For example, the physical object may have a panel that opens and closes and the points determined from the first scan can represent the physical object with the panel closed and the points determined from the second scan can represent the physical object with the panel open.

To align the scans, a transform can be determined using at least one of the images (e.g., keyframes) from each of the scans. In some implementations, one or more of the same features are detected in a key frame of the first scan and a key frame of the second scan. The 3D spatial positions of these same features in the respective coordinate systems is determined and related to one another in a common coordinate system. The feature locations are matched to determine the relative poses of the image sensor for the respective key frames. In other words, by determining an appropriate transform (e.g., rotation r, translation t), to align the same features between the two coordinate systems, the system is able to determine an appropriate transform between the two coordinate systems as a whole. The image sensor poses as well as the 3D model (e.g., point clouds) of the different scans can thus readily be aligned with one another in a common coordinate system using the transform.

In some implementations, the 3D model of the second scan is added to the 3D model of the first scan, e.g., adding additional points, merging points, etc., as illustrated in FIG. 8. As a result, in this example, all of the 3D model data is included in a single model that uses the coordinate system of the first scan. The combined 3D model can then be used to detect the physical object in later obtained images. Since the combined 3D model has points from both scans and thus both of the different conditions (e.g., bright and dim lighting) or configurations it is better able to detect the physical object in later obtained images in either of those conditions.

Moreover, the additional data may make the 3D model generally more robust (e.g., better able to detect the physical object) even if the scans are not associated with different conditions or configurations.

In some implementations, the device matches point cloud features between the scans to determine the transform. In some implementations, a combination of key frame and point cloud features is used to determine the transform. In some implementations, a machine learning model (e.g., a trained neural network) is applied to match image or point cloud features or otherwise determine the transform.

In some implementations a single feature match (e.g., one feature in one key frame from each scan) is used to determine the transform. In some implementations a multi-feature match compares multiple features in a single key frame of the first scan to matching features in a single key frame of the second scan to determine the transform. In some implementations, multiple features in multiple keyframes (e.g., two key frames of each scan, all key frames of each scan, etc.) are used to determine a transform.

Combining 3D models (e.g., point clouds), in some implementations, involves merging points from the different models of different scans. For example, the same physical point might be represented by two different descriptors from two different scans. The system can estimate that the two points should be treated as a single point based on spatial proximity or descriptor similarity. For example, the system may merge/concatenate points that are separated from one another by less than a minimum threshold distance in 3D space.

Note that while FIGS. 1-8 illustrate the use of two scans, the techniques disclosed herein are applicable to combining data from any number of scans. The techniques are similarly useful in many contexts. For example, the techniques can facilitate the creation of CGR environments that includes augmentations (e.g., augmented content) positioned relative to a physical object. A content creator is able to create a 3D model of a physical object using multiple scans for multiple conditions, define augmentations positioned relative to that content in a single coordinate system, and trust that the augmentations will be displayed in the appropriate locations relative to the model regardless of the which condition the physical object is later detected during use of the CGR environment by end users.

The devices used by the content creator (e.g., for image capture and 3D model creation) and end user(s) (e.g., for object detection using the 3D models) can be any of a variety of devices that include a processor, a non-transitory computer readable medium, and an image sensor. In some implementations, the device is a head-mounted device (HMD) that is worn by the content creator or end user. An HMD may enclose the field-of-view of its user. The HMD can include one or more CGR screens or other displays configured to display CGR environments. In some implementations, an HMD includes a screen or other display to display the CGR environment in a field-of-view of the user. In some implementations, the HMD is worn in a way that a screen is positioned to display the CGR environment in a field-of-view of the user. In some implementations, the device is a handheld electronic device (e.g., a smartphone or a tablet), a laptop, or a desktop computer configured to create 3D models of the physical objects and facilitate the creation of CGR environments, e.g., for a content creator, or to present the CGR environment to an end user. In some implementations, the device is an CGR chamber, enclosure, or room configured to present a CGR environment in which an end user does not wear or hold the device.

Figure 9:
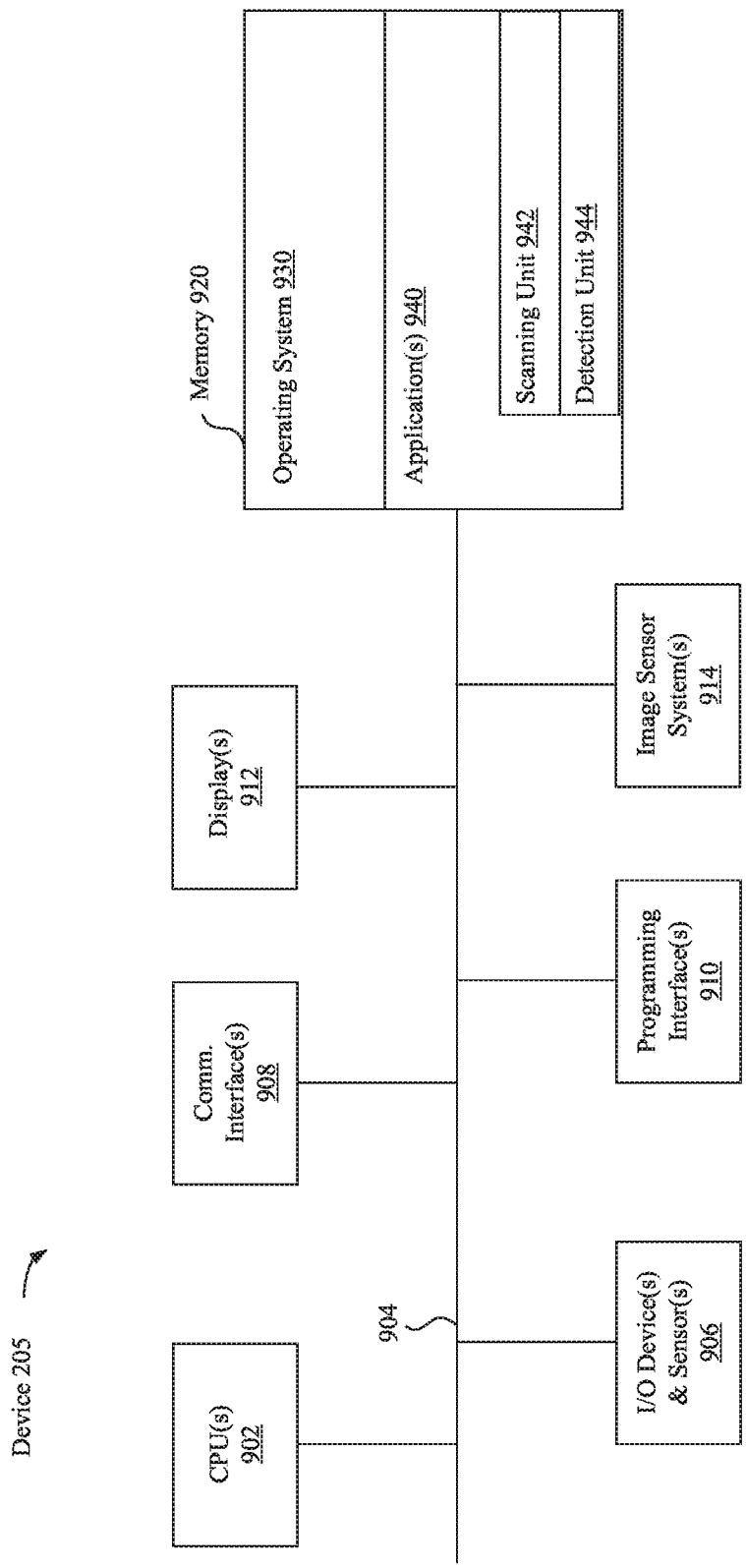
FIG. 9 is block diagram illustrating exemplary components of a device used to generate 3D models of physical objects and detect the physical objects in accordance with some implementations.

FIG. 9 is block diagram illustrating exemplary components of a device used to generate 3D models of physical objects and detect the physical objects in accordance with some implementations. These functions can be separated onto one or more separate devices in various implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 205 includes one or more processing units 902 (e.g., microprocessors, ASICs, FPGAs, GPUs, CPUs, processing cores, or the like), one or more input/output (I/O) devices and sensors 906, one or more communication interfaces 908 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, or the like type interface), one or more programming (e.g., I/O) interfaces 910, one or more displays 912, one or more interior or exterior facing image sensor systems 914, a memory 920, and one or more communication buses 904 for interconnecting these and various other components.

In some implementations, the one or more communication buses 904 include circuitry that interconnects and controls communications between system components. In some implementations, the one or more I/O devices and sensors 906 include at least one of a touch screen, a softkey, a keyboard, a virtual keyboard, a button, a knob, a joystick, a switch, a dial, an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), or the like. In some implementations, movement, rotation, or position of the device 205 detected by the one or more I/O devices and sensors 906 provides input to the device 205.

In some implementations, the one or more displays 912 are configured to present CGR content. In some implementations, the one or more displays 912 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), or the like display types. In some implementations, the one or more displays 912 correspond to diffractive, reflective, polarized, holographic, etc. waveguide displays. In one example, the device 205 includes a single display. In another example, the device 205 includes a display for each eye. In some implementations, the one or more displays 912 are capable of presenting CGR content.

In some implementations, the one or more image sensor systems 914 are configured to obtain image data that corresponds to at least a portion of a scene local to the device 205. The one or more image sensor systems 914 can include one or more RGB cameras (e.g., with a complimentary metal-oxide-semiconductor (CMOS) image sensor or a charge-coupled device (CCD) image sensor), RGB-D cameras, monochrome cameras, IR cameras, event-based cameras, or the like. In various implementations, the one or more image sensor systems 914 further include illumination sources that emit light, such as a flash.

The memory 920 includes high-speed random-access memory, such as DRAM, SRAM, DDR RAM, or other random-access solid-state memory devices. In some implementations, the memory 920 includes non-volatile memory, such as one or more magnetic disk storage devices, optical disk storage devices, flash memory devices, or other non-volatile solid-state storage devices. The memory 920 optionally includes one or more storage devices remotely located from the one or more processing units 902. The memory 920 comprises a non-transitory computer readable storage medium. In some implementations, the memory 920 or the non-transitory computer readable storage medium of the memory 920 stores the following programs, modules and data structures, or a subset thereof including an optional operating system 930 and one or more applications 940.

The operating system 930 includes procedures for handling various basic system services and for performing hardware dependent tasks. In some implementations, the operating system 930 includes built in CGR functionality, for example, including a CGR environment creation feature or a CGR environment viewer that are configured to be called from the one or more applications 940 to create or display CGR environments within a user interface. The applications 940 include a scanning unit 942 configured to create scans of physical objects and create 3D models of the physical objects based on the scans. The applications 940 also include a detection unit 844 configured to use these 3D models to detect the physical objects in later-obtained images, e.g., during a CGR environment.

FIG. 9 is intended more as a functional description of the various features which are present in a particular implementation as opposed to a structural schematic of the implementations described herein. As recognized by those of ordinary skill in the art, items shown separately could be combined and some items could be separated. For example, some functional modules shown separately in FIG. 9 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

Figure 10:
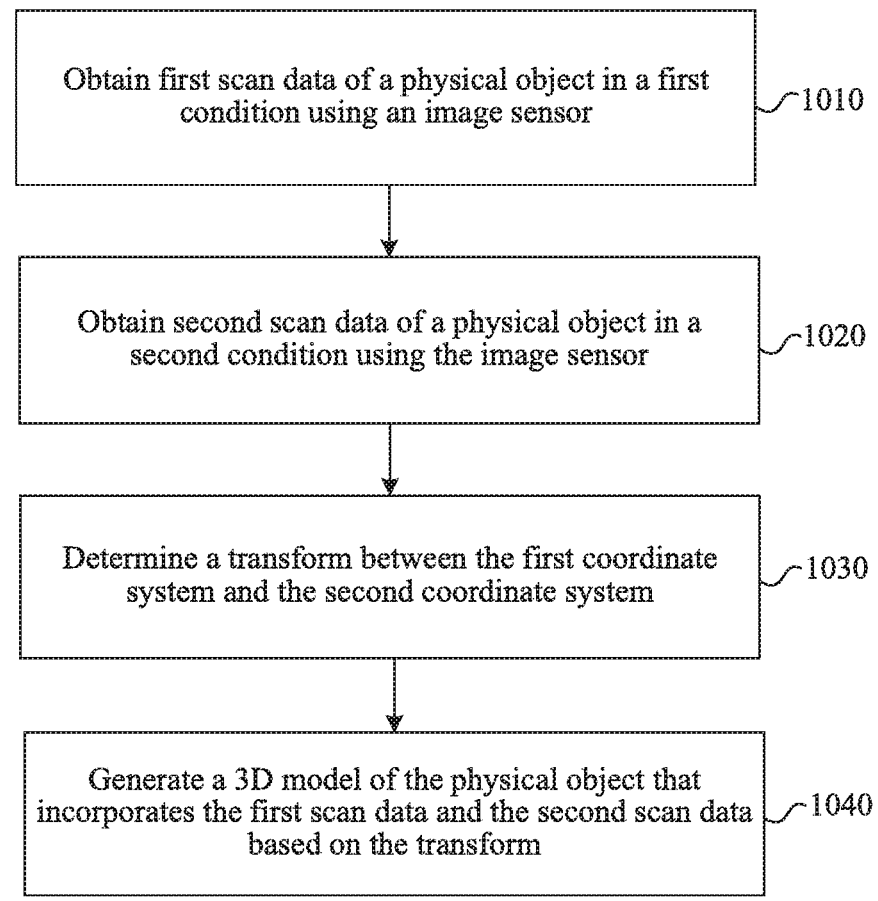
FIG. 10 is a flowchart representation of a method for generating a 3D model that incorporates scan data from multiple scans based on a determined transform in accordance with some implementations.

FIG. 10 is a flowchart representation of a method for generating a 3D model that incorporates scan data from multiple scans based on a determined transform in accordance with some implementations. In some implementations, the method 1000 is performed by a device (e.g., device 205 of FIGS. 2 and 9). The method 1000 can be performed at a mobile device, HMD, desktop, laptop, or server device. In some implementations, the method 1000 is performed by processing logic, including hardware, firmware, software, or a combination thereof. In some implementations, the method 1000 is performed by a processor executing code stored in a non-transitory computer-readable medium (e.g., a memory).

At block 1010, the method 1000 obtains first scan data of a physical object in a first condition using an image sensor. Such first scan data can be acquired using an image sensor such as camera. In some implementations, the first scan data includes a sequence of frames acquired one after another or in groups of images. Image data can include pixel data identifying the color, intensity, or other visual attribute captured by an image sensor. Some of the frames of multiple frames captured may be identified as keyframes, for example, using a key frame selection technique that identifies key frames based on criteria, e.g., time since last key frame, distance change since last key frame, etc.

At block 1020, the method 1000 obtains second scan data of the physical object in a second condition using an image sensor. Obtaining the second scan is similar to obtaining the first scan, however, the positions of the image sensor during the scan may be different and the conditions of the environment or the physical object may be different. For example, the first and second conditions may be different lighting conditions or different object states of a part of the physical object (e.g., different part positions/configurations).

Some implementations provide a user interface that facilitates obtaining of the first scan data, the second scan data, and additional scan data if applicable. For example, in some implementations, the device is configured to request a second scan based on testing the first scan data (e.g., to determine whether the first scan data adequately represents the physical object or various conditions). If not, the device presents a user interface element providing an option (or other instruction) for performing the second scan. After the second scan data is received, the device again checks whether the existing scan data is sufficient and, if not, prompts the user to obtain additional scan data and so on until sufficient scan data is obtained. Whether additional scan data is desirable/required can be determined based on estimating the lighting associated with scan data, for example based on the pixel values in the scan data, using an ambient light sensor, or determined using any other viable technique. The criteria for suggesting/requiring additional scan data is predetermined in some implementations. In other implementations, the criteria for suggesting/requiring additional scan data is specified by the user, e.g., by the content creator, based on the user's preferences or expected end-user conditions.

At block 1030, the method 1000 determines a transform between the first coordinate system and the second coordinate system. In some implementations, the transform is determined by matching an image (e.g., a key frame) of the first scan data with an image (e.g., a corresponding key frame) of the second scan data. In some implementations, the transform is determined by matching multiple images of the first scan data with multiple images of the second scan data. In some implementations, the transform is determined by determining an offset between poses (e.g., position and orientation) of the image sensor associated a first image of the first scan data and a second image of the second scan data. In some implementations, determining a transform involves a minimization or other optimization process. For example, the device may select a transform that aligns key frames in a way that minimizes differences between the physical object's pixels in the key frames. In some implementations, the transform is determined by aligning a first point cloud associated with the first scan data with a second point cloud associated with the second scan data. In some implementations, a transform is determined that aligns more than two coordinate systems, for example, in the case of more than two scans.

At block 1040, the method 1000 generates a 3D model of the physical object that incorporates the first scan data and the second scan data based on the transform. The 3D model may be a point cloud of points associated with descriptors. The point cloud may include points having descriptors based on the first scan data and points having descriptors based on the second scan data. Generating such a point cloud may involve merging a first point having a descriptor based on the first scan data with a second point having a descriptor based on the second scan data, for example, based on proximity of the first point to the second point.

The 3D model that is generated may represent both the first scan data and the second scan data in a single coordinate system. This enables the manual or automatic association of augmented content with the 3D model at a position relative to that single coordinate system to create CGR environments. When a CGR environment is viewed by an end user, the augmented content is correctly positioned. In some implementations, the end user's device obtains image data via the image sensor (e.g., of the real world around the end user), detects the physical object using the 3D model and the image data, and aligns the 3D model with the physical object using the single coordinate system. Detecting the physical object can involve matching the image data with point cloud descriptors of the 3D model or determining a current pose of the image sensor relative to the 3D model. The end user's device can then display a CGR environment depicting the physical object based on the image data and the augmented content. The augmented content is positioned based on aligning the 3D model with the physical object using the single coordinate system.

A computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality. A virtual reality (VR) environment refers to a simulated environment that is designed to be based entirely on computer-generated sensory inputs for one or more senses. A VR environment comprises virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality. An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" or "comprising," when used in this specification, specify the presence of stated features, integers, steps, operations, elements, or components, but do not preclude the presence or addition of one or more other features, integers, steps, operations, elements, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
at a device comprising a processor, a non-transitory computer-readable storage medium, and an image sensor:
obtaining first scan data of a physical object in a first condition using the image sensor, the first scan data comprising images from a plurality of image sensor positions defined in a first coordinate system;
obtaining second scan data of the physical object in a second condition using the image sensor, the second condition different from the first condition, the second scan data comprising images from a plurality of image sensor positions defined in a second coordinate system;
determining, via the processor, a transform between the first coordinate system and the second coordinate system, wherein determining the transform comprises determining an offset between poses of the image sensor associated with a first image of the first scan data and a second image of the second scan data; and
generating a three dimensional (3D) model of the physical object based on the first scan data, the second scan data, and the transform.

2. The method of claim 1, wherein determining the transform comprises matching the first image of the first scan data with the second image of the second scan data.

3. The method of claim 1, wherein determining the transform comprises matching multiple images of the first scan data with multiple images of the second scan data.

4. The method of claim 1, wherein determining the transform comprises aligning a first point cloud associated with the first scan data with a second point cloud associated with the second scan data.

5. The method of claim 1, wherein the 3D model is a point cloud of points associated with descriptors.

6. The method of claim 5, wherein the point cloud includes points having descriptors based on the first scan data and points having descriptors based on the second scan data.

7. The method of claim 5, wherein generating the 3D model comprises merging a first point having a descriptor based on the first scan data with a second point having a descriptor based on the second scan data.

8. The method of claim 7 further comprising determining to merge the first point and the second point based on proximity of the first point to the second point.

9. The method of claim 1, wherein generating the 3D model comprises representing the first scan data and the second scan data in a single coordinate system.

10. The method of claim 9 further comprising associating augmented content with the 3D model at a position relative to the single coordinate system.

11. The method of claim 1 further comprising:
obtaining image data via the image sensor;
detecting the physical object using the 3D model and the image data; and
aligning the 3D model with the physical object using a single coordinate system.

12. The method of claim 11, wherein detecting the physical object comprises matching the image data with point cloud descriptors of the 3D model.

13. The method of claim 11, wherein detecting the physical object comprises determining a current pose of the image sensor relative to the 3D model.

14. The method of claim 11 further comprising displaying a computer generated reality (CGR) environment depicting the physical object based on the image data and augmented content, wherein the augmented content is positioned based on aligning the 3D model with the physical object using the single coordinate system.

15. The method of claim 1, wherein the first and second conditions are different lighting conditions.

16. The method of claim 1, wherein the first and second conditions comprise different object states of an object in the physical object.

17. The method of claim 1 further comprising determining to request a second scan based on testing the first scan data.

18. A system comprising:
a non-transitory computer-readable storage medium;
a image sensor; and
one or more processors coupled to the non-transitory computer-readable storage medium, wherein the non-transitory computer-readable storage medium comprises program instructions that, when executed on the one or more processors, cause the system to perform operations comprising:
obtaining first scan data of a physical object in a first condition using the image sensor, the first scan data comprising images from a plurality of image sensor positions defined in a first coordinate system;
obtaining second scan data of the physical object in a second condition using the image sensor, the second condition different from the first condition, the second scan data comprising images from a plurality of image sensor positions defined in a second coordinate system;
determining, via the processor, a transform between the first coordinate system and the second coordinate system, wherein determining the transform comprises determining an offset between poses of the image sensor associated with a first image of the first scan data and a second image of the second scan data; and
generating a three dimensional (3D) model of the physical object based on the first scan data, the second scan data, and the transform.

19. A non-transitory computer-readable storage medium, storing program instructions computer-executable on a computer to perform operations comprising:
obtaining first scan data of a physical object in a first condition using an image sensor, the first scan data comprising images from a plurality of image sensor positions defined in a first coordinate system;
obtaining second scan data of the physical object in a second condition using the image sensor, the second condition different from the first condition, the second scan data comprising images from a plurality of image sensor positions defined in a second coordinate system;
determining, via a processor, a transform between the first coordinate system and the second coordinate system, wherein determining the transform comprises determining an offset between poses of the image sensor associated with a first image of the first scan data and a second image of the second scan data; and
generating a three dimensional (3D) model of the physical object based on the first scan data, the second scan data, and the transform.

* * * * *